United States Patent [19]

Bodig et al.

[11] Patent Number: 4,512,019

[45] Date of Patent: Apr. 16, 1985

[54] MONITORING CIRCUIT FOR RESETTING MALFUNCTIONING ELECTRONIC COMPONENTS, SUCH AS MICROPROCESSORS

[75] Inventors: Bernd Bodig, Leinfelden; Gerd Höhne, Ludwigsburg; Helmut Schmied, Remshalden, all of Fed. Rep. of Germany

[73] Assignee: Robert Bosch GmbH, Stuttgart, Fed. Rep. of Germany

[21] Appl. No.: 429,221

[22] Filed: Sep. 30, 1982

[30] Foreign Application Priority Data

Apr. 16, 1982 [DE] Fed. Rep. of Germany ....... 3214006

[51] Int. Cl.³ ...................... G06F 11/00; F02D 35/00
[52] U.S. Cl. .................................. 371/12; 364/431.11; 371/62
[58] Field of Search ............................ 371/62, 57, 12; 364/431.11, 200, 900

[56] References Cited

U.S. PATENT DOCUMENTS

| | | | |
|---|---|---|---|
| 4,244,050 | 1/1981 | Weber et al. | 364/431.11 |
| 4,304,003 | 12/1981 | Kakizawa et al. | 371/62 |
| 4,317,167 | 2/1982 | Hartig et al. | 364/185 |
| 4,355,359 | 10/1982 | Kanegae et al. | 371/62 X |
| 4,405,982 | 9/1983 | Ruhnau et al. | 371/62 X |
| 4,408,328 | 10/1983 | Wakai | 371/62 |
| 4,410,938 | 10/1983 | Higashiyama | 364/431.11 X |

OTHER PUBLICATIONS

Initializing Circuit for Digital Computers, Research Disclosure, (G.B.), No. 184, (Aug. 1979), p. 411.

*Primary Examiner*—Charles E. Atkinson
*Attorney, Agent, or Firm*—Frishauf, Holtz, Goodman & Woodward

[57] ABSTRACT

A capacitor which is charged by recurring square waves of a normally functioning microprocessor discharges at a steady rate, so that if the square waves do not continue, an operational amplifier will switch over and produce a reset pulse for the microprocessor. Repeated transitions of one polarity of the square wave recharge the capacitor during a short interval terminated by a second operational amplifier when the capacitor reaches a fixed level of charge. This second amplifier, which has feedback coupling, also initiates the timing discharge of the capacitor. A diode network at its output prevents charging the capacitor in the static state. This arrangement makes it unnecessary to provide another capacitor for quickly recharging the capacitor to prevent its discharge from switching over the first-mentioned operational amplifier.

9 Claims, 3 Drawing Figures

0
MONITORING CIRCUIT FOR RESETTING MALFUNCTIONING ELECTRONIC COMPONENTS, SUCH AS MICROPROCESSORS

This invention concerns a monitoring circuit for electronic components which in normal operation produce dynamic signals at their output, as is the case with microcomputers and the like.

Monitoring circuits for data processing systems that operate in connection with microcomputers located in electrically hostile surroundings have already become known. The known circuits, however, require at least two capacitors, a first one for signal storage and a second one for dynamically charging the storage capacitor in a following operation. Such known circuits can be provided in the form of integrated circuits only at great expense and require a relatively large number of external components to be connected to the integrated circuit units.

THE INVENTION

It is an object of the present invention to provide a monitoring circuit that lends itself better to provision in the form of integrated circuits and, if possible, utilizes only a single capacitor.

Briefly, the use of a second capacitor is made unnecessary by utilizing, in the circuit for charging the capacitor in response to dynamic signals from the monitored component, an amplifying device incorporating feedback coupling for stopping the charging and beginning the discharging of the capacitor when the capacitor reaches a certain level of charge. The amplifying device can conveniently be an operational amplifier, such as are readily available in integrated circuit form. A resistor diode network can advantageously be used to prevent charging of the storage capacitor in the static condition of the circuit.

The monitoring circuit of the invention has the advantage that because it is so readily constituted with integrated circuits and needs no external components, it can be incorporated in a single casing with the microprocessor chip. This is a great advantage for microprocessors in an electrically hostile environment, such as the engine compartment of a motor vehicle.

An improved embodiment of the invention incorporates also a supply voltage monitoring feature, so that a reset pulse for the monitored component can be provided not only when the flow of dynamic signals from the component shows that is is malfunctioning, but also when the supply voltage is switched on and when the supply voltage sinks to a value below a predetermined voltage level. Thus, no supplementary processor reset circuits are necessary. Another feature that can advantageously be added to the monitoring circuit of the invention is to block the function output of a microprocessor when there are indications that the microprocessor is not operating in an undisturbed manner. When the monitoring circuit of the invention is applied to a computer-controlled ignition system for a motor vehicle, provision can be built into the monitoring circuit to prevent a continuous current from flowing in the ignition coil.

THE DRAWINGS

The invention is further described by way of illustrative example with reference to the annexed drawings, in which.

DESCRIPTION OF THE ILLUSTRATED EMBODIMENTS

Figure 1:
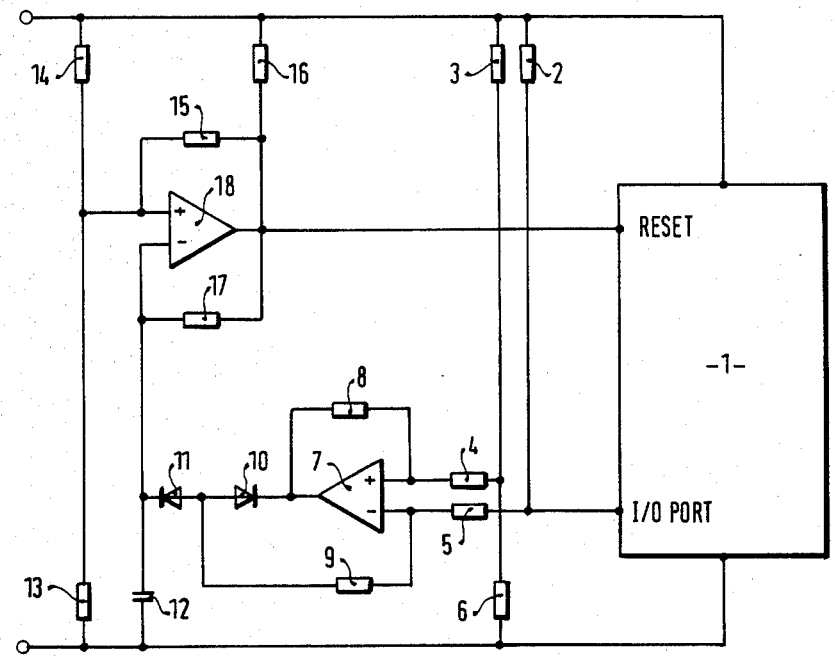
FIG. 1 is a circuit diagram of a first embodiment of the invention.

FIG. 1 shows, in a circuit according to the invention, a microprocessor 1 having an input/output port and a reset input. Other connections of the microprocessor are not shown, since they are of no concern to the invention, as is also the particular kind of service in which the microprocessor is used. Any of the available types of microprocessors can be served by a circuit of the kind of FIG. 1 for the monitoring function now to be described. If such a microprocessor is put into use in an electrically hostile environment, it is necessary to assure that the microprocessor is operating undisturbed, even when strong disturbing voltages are caused to appear on the data connections or in the interface circuit by which the microprocessor may provide control or indications to other equipment. Such disturbing voltages, particularly as appear in motor vehicles or in the neighborhood of powerful electric motors, it can occur that a microcomputer in such a location is switched into an undefined status. In such a case, it is necessary to provide, by means of a resetting circuit, that the microprocessor again is put into a defined state.

From the problem just described arises the concept of adding to the microprocessor a circuit that will reset the system whenever it fails to receive periodic signals from the microcomputer constituted by the microprocessor and its memories, etc. Either these periodic signals can be generated by the softwear of the microcomputer, or else multiplex signals already provided in the system, for example for indicator devices, can be utilized. Whenever the microprocessor stops or lapses into an undefined condition, or if any particular input or output signals fail to be available, the multiplex signals break off at the corresponding input/output (I/O) port. These signals are evaluated by the resetting circuit.

The I/O port of the microprocessor 1 is connected through a resistor 2 with the positive voltage supply line. In addition, a resistor 5 connects the I/O port 1 to the inverting input of an operational amplifier 7. The noninverting input of an operational amplifier 7 is connected through a resistor 4 to a voltage divider composed of the resistances 3 and 6, which are connected in series and respectively connected to the positive and negative poles of the voltage supply. The output of the operational amplifier 7 is provided with positive feedback by a resistor 8 which is connected to the noninverting input of the operational amplifier 7. A diode 10 is also connected to the output of the operational amplifier 7. A diode 11 poled in the opposite direction is connected to the other terminal of the diode 10 and at that connection point is connected a resistor 9, the other end of which is connected to the inverting input of the operational amplifier 7 for negative feedback. The cathode of the diode 11 is connected both to the input of a second operational amplifier 18 and to the capacitor 12, the other terminal of which is connected to the negative pole of the voltage supply.

A voltage divider composed of the resistances 13 and 14 is connected between the voltage supply lines and has its tap connected to the noninverting input of the operational amplifier 18. A resistor 15 is connected to the output of the operational amplifier 18 and leads back to the noninverting input of the latter. A resistor 17 leads from the output of the operational amplifier 18 to the inverting input of the latter, a resistor 16 connects the output of the operational amplifier 18 to the positive voltage supply line, and still another connection goes from the output of the operational amplifier 18 to the reset input of the microprocessor.

The circuit of FIG. 1 has the function of monitoring the correct functioning of the microprocessor. In order to make possible such monitoring, the microprocessor delivers continuous rectangular wave signals at a suitable microprocessor output. In the case of disturbance of any kind of the operation of the microprocessor, these rectangular wave signals fail and the output signal can then remain, with equal likelihood, at the logical value 0 or at the logical value 1.

The monitoring circuit must, according to whether rectangular signals are provided or not, either supply to the reset input of the microprocessor the proper logical level to let the microprocessor continue to function as it may be programmed, or else reset the microprocessor.

The operation of the monitoring circuit is explained with reference to FIG. 2. In normal operation, the output of the operational amplifier 18 is zero. This negative switching condition is maintained by means of the voltage divider containing the resistances 13 and 14 and the correspondingly charged capacitor 12. The capacitor discharges continuously through the resistor 17. In order that its charge voltage should not get down below the switching threshold of the operational amplifier 18, it must be recharged. This is done pulse-wise through the resistors 5 and 9 and the diode 11 when the I/O dynamic signal of the microprocessor 1 goes to the logic level 1.

Figure 2:
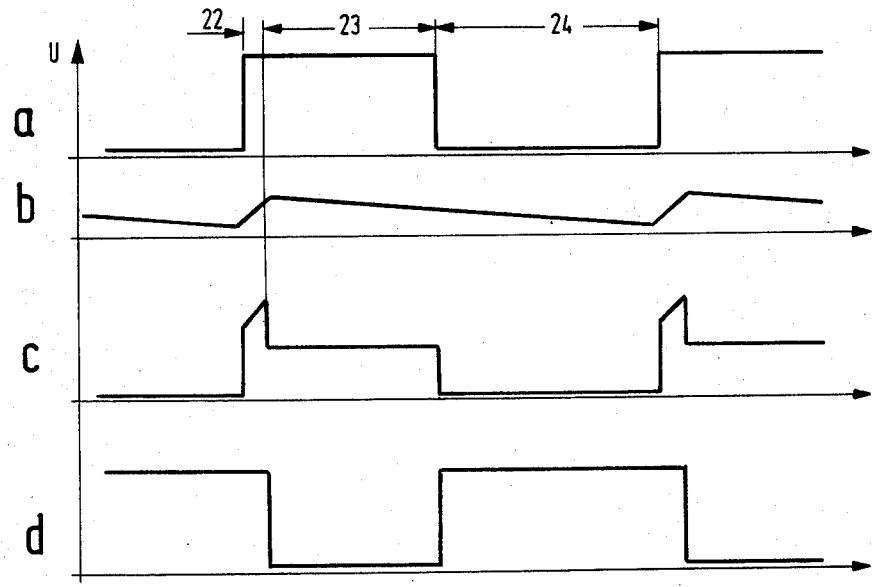
FIG. 2 is a pulse and timing diagram for explaining the operation of the circuit of FIG. 1.

On the upper horizontal axis a of FIG. 2 is shown the output signal of the microprocessor at its I/O port. At the transition from condition 0 to condition 1, the charge current flows into the capacitor 12 and charges the latter as shown on the second horizontal axis b of FIG. 2. With increasing charge of the capacitor 12, the voltage at the inverting input of the operational amplifier 7 also rises, as shown on the third horizontal axis c of FIG. 2. When a predetermined voltage is reached which is set by the resistors 3 and 6, the operational amplifier 7 switches from out 1 to output 0 producing a voltage is produced as shown on the bottom horizontal axis d of FIG. 2. The capacitor 12 can now be charged no further, since any current that might flow from the positive voltage source over the resistors 2,5 and 6 and over the diode 10 flows off to ground.

Charging of the capacitor 12, therefore, takes place only during the time interval 22. Thereafter, the capacitor discharges. If pulses now do not follow each other at brief intervals, the capacitor keeps on discharging, as is shown in the time intervals 23 and 24 in FIG. 2. If in this discharge the charge goes down below the threshold voltage of the operational amplifier 18, the latter switches over and thereby provides a reset signal to the microproessor 1. It makes no difference in this case whether the output voltage at the I/O port is a logical zero signal or a logical one signal. In the case of a logical zero signal, the inverting input of the operational amplifier 7 is in any case at a voltage lower than its noninverting input, so that its output is at a logical one signal (having been made such, for instance, at the end of the interval 23 of FIG. 2). The capacitor 12 cannot be recharged over the resistances 5 and 9 and the diode 11 so long as the I/O output signal is logical zero. If a logical one is present at the output of the I/O port, the capacitor 12 simply continues discharging after the events already described. The storage capacitor 12 is the only capacitor needed in this circuit for monitoring the microprocessor.

Figure 3:
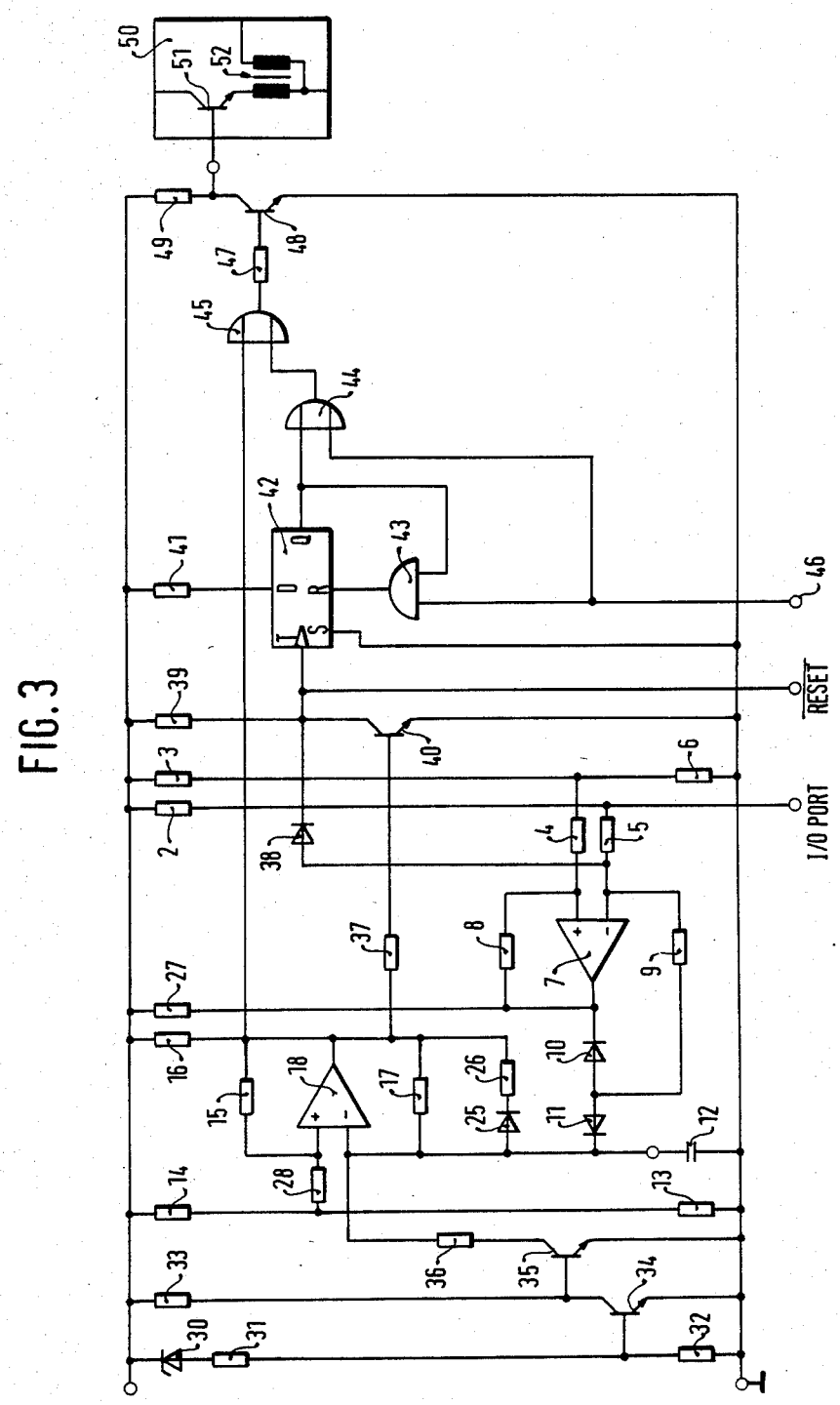
FIG. 3 is a circuit diagram of an embodiment of the invention incorporated in a computer-controlled ignition system.

The circuit of FIG. 3 is built around the monitoring circuit of FIG. 1. Identical components are accordingly designated with the same reference numerals. A signal from the I/O port of a microprocessor not shown in this figure reaches the inverting input of the operational amplifier 7 over a resistor 5. A resistor 2 leads from this point to the positive voltage supply line. A resistor 4 connects the noninverting input of the operational amplifier 7 to a voltage divider formed by the resistors 3 and 6. The output of the operational amplifier 7 leads to a diode 10 and to a resistance 8 which goes back to the noninverting input of the operational amplifier 7. Another diode oppositely poled follows the diode 10. Between the diodes 10 and 11, at their common connection, a resistor 9 is connected that leads to the inverting input of the operational amplifier 7. A capacitor 12 is connected to the cathode of the diode 11 and has its other terminal connected to the ground bus of the circuit. The cathode of the diode 11 is also connected to the inverting input of the operational amplifier 18, which has its noninverting input connected over a resistor 28 with a voltage divider composed of the resistances 13 and 14. The output of the operational amplifier 18 is connected on the one hand through a resistor 15 to its noninverting input and on the other hand through a resistance 17 and the series combination of a resistance 26 and a diode 25 with its inverting input. A resistance 16 is also provided between the output of the operational amplifier 18 and the positive voltage supply line. Another resistor 27 leads from the positive voltage supply line to the output of the operational amplifier 7.

In this circuit the series combination of a Zener diode 30 and the resistors 31 and 32 is provided, which is connected between the positive and negative voltage supply lines. At the common connection of the resistors 31 and 32, the base of a transistor 34 is connected, which has its emitter connected to the negative voltage supply line, while its connector is connected on the one hand to the base of a transistor 35 and on the other hand through a resistor 33 to the positive voltage supply line. The emitter of the transistor 35 is connected to the negative voltage supply line, while its collector is connected through a resistance 36 to the inverting input of the operational amplifier 18. The output of the operational amplifier 18 is connected through a resistor 37 to the base of the transistor 40. The emitter of the transistor 40 leads to the negative voltage supply line. The collector of the transistor 40 is connected on the one hand through a resistor 39 to the positive voltage supply line and on the other hand to the clock input of a D-flipflop 42. A diode 38 is connected between the inverting input of the operational amplifier 7 and the collector of the transistor 40. The inverted or negative reset signal for the reset input of the unshown microcomputer can be obtained at the collector of the transistor 40. The D-input of the flipflop 42 is connected through a resistor 41 to the positive voltge supply line, while the set input of the D-flipflop is connected to ground. The reset input of the flipflop 42 is connected with an output of an AND-gate 43, one input of which is connected to the output of the D-flipflop 42 and the other to the function output of the microcomputer.

An OR-gate 44 is connected on the one hand to the function output 46 of the microprocessor and on the other hand to the output of the flipflop 42. The output of the OR-gate 44 is connected to an input of an OR-gate 45. The other input of the OR-gate 45 is connected to the output of the operational amplifier 18. The output of the OR-gate 45 is connected through a resistor 47 with the base of a transistor 48, the emitter of which is connected to the negative voltage supply line and the collector of which is connected through a resistor 49 with the positive voltage supply line. A connection leads from the collector of the transistor 48 to an ignition device 50 for an internal combustion engine not further shown in the drawing. In the ignition stage 50, there are schematically shown an ignition coil 52 and a switching transistor 51 that operates as the interruptor for the ignition coil. The base of the switching transistor 51 is connected to the signal line from the collector of the transistor 48.

The operation of the circuit of FIG. 3, so far as concerns the operational amplifier 7 and 18, is the same as already described with reference to FIG. 1. The transistor 40 provides in inversion of the reset signal which is necessary for many kinds of microprocessors. The battery voltage monitoring consists essentially of the Zener diode 30 and the transistors 34 and 35. The response voltage of this circuit portion is so designed that the transistor 34 blocks when the supply voltage drops below a minimum acceptable value, as a consequence of which the transistor 35 becomes conducting. The capacitor 12 is then discharged through the resistor 36, which causes the provision of a reset by means of the operational amplifier 18. Since in the initial switching on of the supply voltage, at least at the beginning the voltage is below some particular value, this circuit is also capable of providing the "power on" reset.

The diode 38 assures that after the termination of a reset operation the operational amplifier 7 blocks in every case. After the termination of the reset pulse, the capacitor 12 is charged up to its maximum voltage. It is thus assured that the discharging of the capacitor 12 is identical, whether in normal operation or after the reset. Thus the circuit becomes independent of when the next transition of the rectangular wave occurs at the I/O port. This has the advantage that the response time of the release of a reset signal is clearly defined. There is the further advantage that the capacitor can be made relatively small because of these defined relationships.

In many cases it is necessary to bring connected utilization devices into defined conditions during the reset operation and a short time thereafter, while for example an initializing program runs. A computer controlled ignition system can be cited as an example in which the final stage must have no current, in order that a final stage, for example, the ignition coil of the ignition system will not be destroyed by continuous conduction of current. This protection is provided by preventing the signal of the function output from getting to the utilization circuit.

In the illustrated example, this effect is obtained as follows: during a reset operation the required blocking signal is supplied directly from the output of the operational amplifier 18 through the OR-gate 45. At the end of the reset interval, the output Q of the flipflop 42 is set to logical 1 by the positive signal flank at the collector of the transistor 40. In the normal running of the reset operation, the function output 46 is also set to logical 1 during the reset interval. Thus, after the running of the reset signal, a logical 1 is present at both inputs of the AND-gate 43. The output Q of the flipflop 42 is again set to logical zero by the reset input R of the flipflop. The signal from the function output is maintained in this case until the completion of the initialization program by virtue of the OR-gates 44 and 45.

If a disturbance causes a malfunction, a logical 1 signal will not appear at the function output 46 of the microprocessor. The output 2 of the flipflop can then no longer be reset. A switching operation of the transistor 48 cannot now take place because of the set flipflop 42. For the case of an ignition system, this signifies that the final stage of the ignition system remains without current.

The circuit of FIG. 3, again, has the advantage that it operates with only one capacitor. It is therefore readily capable of being integrated as an integrated circuit unit and can, for example, be provided along with the microprocessor on a single chip or can be supplied as an additional chip for control of the microprocessor.

Typical values that are found to be useful for the capacitor 12 and the resistors 8, 9, 15, 17 and 26 of the operational amplifiers 7 and 18, are given in the following table, which also illustrates one particular type designation of operational amplifiers suitable for these operational amplifiers.

C12: 0,22 μF
R8: 8,2 kΩ
R9: 5,1 kΩ
R15: 56 kΩ
R17: 1 MΩ
R26: 1 MΩ
Op. amplifiers: TAA2762 (Siemens)

Although the invention has been described with reference to particular illustrative examples, it will be recognized that variations and modifications may be made within the inventive concept.

I claim:

1. Monitoring circuit for electronic components which in normal operation produce dynamic signals at their output, said monitoring circuit containing only one capacitor, said capacitor (12) serving for being charged by said signals, said monitoring circuit further including means (13-18) for resetting the monitored component to a defined state when said capacitor discharged to a predetermined extent, an amplifying device (7) connected to a circuit (5,9,11) for charging said capacitor (12) in response to said dynamic signals, said amplifier being provided with negative feedback coupling (8) and being connected for stopping the charging and beginning the discharging of said capacitor when said capacitor reaches a predetermined level of charge.

2. Monitoring circuit according to claim 1 in which said negative feedback coupling of said amplifier includes a resistor-diode network (9,10,11) for preventing charging of said capacitor (12) in the static condition of the circuit.

3. Monitoring circuit according to claim 2 in which means (30 to 36) are provided for monitoring the supply voltage for the monitored component and for providing a reset pulse to reset said component in response to the switching of said supply voltage and for providing a reset pulse to reset said component whenever said supply voltage falls below a predetermined voltage level.

4. Monitoring circuit according to claim 2 in which a third diode (38) is connected between the input of said amplifying device (7) and the reset connection of said monitored component for charging said capacitor to its maximum charge after the termination of each resetting operation of the circuit.

5. Monitoring circuit according to claim 2 in which the monitored component has a function output (46) connected to an equipment (50) controlled by said component and in which means (41 to 49) including an active storage component (42) are provided for supplying at least one blocking signal to said controlled equipment if during the period of a resetting operation of the circuit a blocking signal does not even briefly appear at said function output.

6. A computer controlled ignition system for a motor vehicle comprising a microprocessor and a monitoring circuit according to claim 5, said microprocessor being the monitored component and an ignition circuit including an ignition coil having primary and secondary windings and a transistor switch in the circuit of said primary winding being the controlled equipment, said transistor being connected for being nonconducting during resetting operations of said circuit and for being kept nonconducting after a reset operation of said circuit so long as no signal is provided from said function output of said monitored component.

7. An ignition system according to claim 6 in which said active storage component (42) is connected for being set by the positive signal flank at the collector of said transistor, which signal flank follows a reset signal for said microprocessor and for being reset by a signal from said function output.

8. An ignition system according to claim 7 in which a third diode (38) is connected between the input of said amplifying device (7) and the reset connection of said microprocessor for charging said capacitor to its maximum charge at the termination of each resetting operation of the circuit.

9. Monitoring circuit according to claim 5 in which a third diode (38) is connected between the input of said amplifying device (7) and the reset connection of said monitored component for charging said capacitor to its maximum charge after the termination of each resetting operation of the circuit.

* * * * *